United States Patent Office 2,860,084
Patented Nov. 11, 1958

2,860,084

GERMICIDAL COMPOSITION COMPRISING IODINE AND A N-ACYL COLAMINO FORMYL METHYL QUATERNARY AMMONIUM SALT

Clyde Robert Jackson, Portland, Oreg., assignor to Ruson Laboratories, Inc., Portland, Oreg., a corporation of Oregon No Drawing. Application August 2, 1954
Serial No. 447,404

12 Claims. (Cl. 167—33)

This invention relates to an iodine-containing germicidal composition useful as an effective germicide, bactericide, and antiseptic material for hospital, household and industrial applications.

It long has been recognized that iodine potentially is an exceedingly valuable germicide because of its high degree of germicidal activity. It has been used in various forms as a germicide for the skin, for disinfecting wounds and mucous membranes, and for sterilizing hair, catgut and surgical instruments. It also has been used as a prophylactic and therapeutic agent in diseases caused by bacteria, viruses and fungi, for the disinfection of drinking water and swimming pool water; and for the sanitization of eating utensils.

A particularly desirable property of iodine as a germicide resides in the fact that its biocidal spectrum is extremely broad, ranging from the viruses to the more primitive phyla of the nematodes. Thus iodine exhibits a lethal, as well as an inhibiting action against a wide variety of organisms, including the viruses, rikettsia, spores, bacteria, yeast, molds, fungi, protozoa (cysts) and the trophozoites and helminthes (nematodes, trematodes, and cestodes; ova and worms).

Various investigators have established that iodine is almost unique in its efficiency in disinfecting surgical instruments. It further has been indicated that iodine is effective against tubercle bacilli and other extremely resistant bacteria under conditions where no other germicide will affect them. Still further, it has been demonstrated that iodine is extremely effective against various virus diseases including influenza, infectious hepatitis, and polio.

In addition to the foregoing, the use of iodine as a germicide has ancillary advantages. It serves as its own indicator, since when the characteristic brown color of the iodine solution disappears, it is evident that its iodine content has been consumed. Also, it exhibits its devastating action against microorganisms very rapidly without the necessity of using elaborate equipment, such as autoclaves and ovens.

In spite of the foregoing significant advantages, the use of uncombined iodine as a germicide and antiseptic has been severely limited by numerous offsetting disadvantages. It is a strong primary irritant and sensitizer for animal tissue. Its action is non-selective as between bacterial and mammalian protein. Its uncontrolled use on the skin forms deep ulcers which delay healing. It is highly toxic. Its activity may be diminished or neutralized by the action of such compositions as serum, feces, ascitic fluid, sputum, urine, glycerine, syrup, egg, milk and certain inorganic substances as sodium thiosulfate, ammonia water and various reducing agents.

Other disadvantages attending the use of free iodine are the fact that it has a high vapor pressure and volatilizes rapidly from its solutions and from surfaces to which it is applied. It is highly corrosive to metals so that it cannot be used in the sterilization of many surgical instruments. It stains tissue and fabrics badly. It precipitates out of solution when its tinctures are diluted with water. Its aqueous solutions are weak and not penetrating.

Accordingly it is the primary object of this invention to provide a germicidal iodine composition having all of the numerous significant advantages characterizing iodine, but free from the various undesirable properties of that substance.

It is another object of this invention to provide a germicidal iodine composition having a phenol coefficient which is even higher than that of free iodine.

It is another object of this invention to provide a germicidal iodine composition which has a wide biocidal spectrum and is active against wide variety of organisms, including viruses.

It is another object of this invention to provide a germicidal iodine composition which has a high activity even in the presence of foreign matter such as serum, albumin and blood.

It is another object of this invention to provide a germicidal iodine composition which has a high concentration of iodine.

It is another object of this invention to provide a germicidal iodine composition which works rapidly.

It is another object of this invention to provide a germicidal iodine composition which is effective in sterilizing instruments but is no more corrosive toward metals than is ordinary water even though the composition contains a substantial proportion of iodine.

It is another object of this invention to provide a germicidal iodine composition which has low toxicity both to the surgeon and the patient.

It is another object of this invention to provide a germicidal iodine composition which can be easily washed off with cold water and does not stain tissue or fabrics permanently.

It is another object of this invention to provide a germicidal iodine composition which is substantially non-volatile.

It is another object of this inventioon to provide a germicidal iodine composition which serves as its own indicator.

It is another object of this invention to provide a germicidal iodine composition which is non-irritating and non-sensitizing.

It is another object of this invention to provide a germicidal iodine composition which forms stable solutions.

It is another object of this invention to provide a germicidal iodine composition which exhibits a detergent action, thereby increasing its efficiency as a germicide.

It is another object of this invention to provide a germicidal iodine composition which has high penetrating capacity for tissue.

It is another object of this invention to provide a germicidal iodine composition which does not have an objectionable odor or taste.

The present invention is predicated upon the discovery that when elemental iodine is combined with certain of the organic quaternary nitrogen compounds its disadvantages as a germicide, noted above, are overcome while its advantages are retained. In fact, there appears to be a coaction between the iodine and the quaternary compound so that the combination of the two is much more useful as a germicide than is either one used alone.

This is evidenced by the fact that the combination has a phenol coefficient which is even greater than the phenol coefficient of the quaternary compound. For some organisms this represents an increase in phenol coefficient of from 200 to 2000.

The class of organic quaternary nitrogen compounds which are suitable for use with elemental iodine in the formulation of the presently described germicidal compositions has the general structural formula:

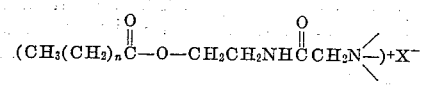

wherein n is any number from 4 to 20 inclusive, where the three indicated valence bonds attached to nitrogen are satisfied by members of a heterocyclic ring of which the nitrogen is a member, and wherein X is an anion, preferably halogen.

Thus a preferred organic quaternary ammonium compound is N caproyl colamino formyl methyl pyridinium chloride. Other examples of suitable quaternary ammonium compounds are those having formulas similar to the above generic formula, but wherein the acid radical is lauroyl, myristoyl, palmitoyl, stearoyl, or caproyl; wherein the heterocyclic nitrogen compound is a picoline, 2-4 lutidine, pyrolidine, quinoline, isoquinoline, or pyridine derivative; and wherein the anion is a bromide, iodide, nitrate, sulfate, phosphate, or chloride ion. Accordingly, examples are:

N caproyl colamino formyl methyl pyridinium chloride
N lauroyl colamino formyl methyl pyridinium chloride
N stearoyl colamino formyl methyl pyridinium bromide
N myristoyl colamino formyl methyl pyridinium chloride
N caproyl colamino formyl methyl picolinium bromide
N caproyl colamino formyl methyl lutidinium iodide
N caproyl colamino formyl methyl pyrolidinium iodide
N caproyl colamino formyl methyl quinolinium nitrate
N caproyl colamino formyl methyl isoquinolinium sulfate
and the like.

The hereindescribed iodine-containing composition may be used in the form of its solutions or as a solid or semi-solid material. Preferably it is used in the form of an aqueous solution having the composition set forth in Table I.

TABLE I

| | General Range (percent by weight) | Preferred Range (percent by weight) |
| --- | --- | --- |
| Elementary iodine | Trace—25 | 0.1–15 |
| Quaternary ammonium salt | Trace—50 | 5–25 |
| Aqueous solvent | To 100 | To 100 |

Although it is preferred to employ substantially pure water as the aqueous solvent, it is to be understood that various water-soluble organic solvents may be admixed therewith if desirable or necessary. Suitable organic solvents are methanol, ethanol, propanol, methyl acetate, ethyl acetate, propyl acetate, acetone, methyl ethyl ketone, and the like. For the usual physiological applications, however, it is preferred to employ little, if any, organic solvent together with the water since the former increases the vapor pressure of the resulting solution, with attendant loss of iodine and solvent, and since the organic solvent per se may be irritating to exposed tissue.

Although the foregoing constituents may be compounded in any suitable manner, a preferred procedure is as follows: First, the quaternary ammonium compound is dissolved in water to form a solution having a quaternary ammonium compound concentration of from 20 to 50%. Next, the elemental iodine is mixed in. This is a relatively difficult procedure and requires from 1 to 4 hours of vigorous mixing. To insure thorough dispersion of the iodine throughout the mixture, it is preferred to let the mixture stand for from 1 to 4 days after mixing in the iodine. It then may be diluted with water or other solvent to the desired iodine concentration. On the other hand, if a paste is desired, the solution may be evaporated to the desired consistency.

It is preferred to effectuate the foregoing procedure without heating the mixture above 100° F. If more than this amount of heat is applied, the composition may be darkened and the iodine volatilized.

To prevent conversion of the iodine to iodide and iodate compounds, it is important that the foregoing solution be kept at a pH of less than 9, preferably less than 7, the compositions being most effective, however, in the pH range of between 1.5 and 4. This pH range may be established by the addition of various buffering agents, if necessary. Suitable buffering agents are the mineral acids including hydrochloric acid, sulphuric acid, phosphoric acid, certain of the organic acids including acetic acid, propionic acid, and benzoic acid. Various compatible acid salts also may be employed for this purpose, typical ones being sodium acid sulfate, monobasic sodium phosphate and the like.

The germicidal iodine compositions of the present invention, their preparation, and their application are illustrated in the following examples wherein parts are given in parts by weight.

*Example 1*

17 parts N caproyl colamino formyl methyl pyridinium chloride was dissolved in 17 parts water. 3 parts iodine then were added and the resulting mixture stirred vigorously for 4 hours at substantially atmospheric temperature. The resulting mixture was permitted to stand for 8 days until the iodine had completely dispersed throughout the solution. 63 parts water then were added and thoroughly mixed in. This formed the final mixture.

Observation of the foregoing composition over a period of 30 days indicated that it was stable and did not lose an appreciable amount of iodine by volatilization. In addition, it was non-corrosive to animal tissue; non-corroding toward metals; detergent in its action; non-staining; non-irritating and non-sensitizing toward animal tissue; substantially non-caustic; and without objectionable odor or taste. It possessed a characteristic brown color and as long as the color persisted it retained an iodine content. Accordingly, it served as its own indicator during application since as the brown color became lighter and the solution eventuallly became colorless it was apparent that its iodine content had been consumed.

*Example 2*

This example illustrates the efficiency of the hereindescribed iodine compounds as germicides.

An iodine composition containing 3.4% iodine and 17% by weight N caproyl colamino formyl methyl pyridinium chloride as an aqueous solution was applied to the spores of tricophyton interdigitale, phenol being used as a control. The results showed that the composition killed within 10 minutes, but not in 5, at a dilution of 1:40,000. Phenol, however, killed this fungus at a required dilution of 1:45. Accordingly, the hereindescribed composition has a phenol coefficient of 890 when applied to this spore former, which is the causative agent of athlete's foot.

*Example 3*

Comparative tests were conducted employing N caproyl colamino formyl methyl pyridinium chloride as representative of the hereindescribed iodine germicidal compounds and four other types of disinfectant. The test organism again was tricophyton interdigitale. It was found that 1,000 p. p. m. chlorine, 1,000 p. p. m. sodium hypochlorite, 2,500 p. p. m. alkyl dimethyl benzyl ammonium chloride quaternary ammonium compound (Roccal) and 5,000 p. p. m. chloramine-T were required to kill this organism within 15 seconds. However, only 5 p. p. m. of an aqueous solution containing 3.4% iodine and 17% by weight N caproyl colamino formyl methyl pyridinium chloride were required to kill this organism in the same time.

Example 4

Other tests were conducted to illustrate the effectiveness of the hereindescribed compositions against other microorganisms, namely, M. caseolyticus, E. coli, and Ps. aeruginosa. These microorganisms were taken from 24 hour slide grown preparations using agar as the growth medium. The germicide employed was an iodine composition containing 3.4% iodine and 17% by weight N caproyl colamino formyl methyl pyridinium chloride used as an aqueous solution buffered with M/50 sodium acetate to a pH of 5.0. The terminal pH at the end of the run was 4.9 to 5.0. The procedure employed was the Jones modification of the Weber and Black technique. The results were as follows:

| Micro-organism | Micro-organism concentration, cells/cc. | Germicide concentration, p. p. m. | Organic Matter (skim milk), percent | Plate Count (Seconds) | | | | |
|---|---|---|---|---|---|---|---|---|
| | | | | 15 | 30 | 45 | 60 | 120 |
| M. caseolyticus | 215 × 10⁶ | 25 | None | 0 | 0 | 0 | 0 | 0 |
| Do | 215 × 10⁶ | 25 | 1 | 20 | 119 | 20 | 7 | 50 |
| E. coli | 440 × 10⁶ | 25 | None | 1 | 0 | 0 | 0 | 0 |
| Do | 440 × 10⁶ | 25 | 1 | ¹TC | TC | 550 | 72 | 10 |
| Ps. aeruginosa | 370 × 10⁶ | 25 | None | 160 | 46 | 13 | 16 | 0 |
| Do | 370 × 10⁶ | 25 | 1 | TC | TC | TC | TC | 7 |

¹ Too numerous to count.

Example 5

Another test was conducted to illustrate the effectiveness of the iodine composition of the present invention against yeasts. In carrying out the test a medium containing 1% Saccharomyces ellipsoideus, 1% glucose and 1% agar was incubated for 18 hours at 30° F. 244 cc. of the resulting yeast suspension were added to 5 milligrams of an aqueous iodine composition containing 3.4% iodine and 17% by weight N caproyl colamino formyl methyl pyridinium chloride. The result was a complete kill of the yeast after a contact period of 2 minutes. These tests thus indicate conclusively that the hereindescribed iodine compositions are extremely effective against the test organisms even in the presence of organic matter.

Accordingly, it will be apparent that by the present invention I have provided a germicidal iodine composition which is extremely effective in its germicidal action against a wide variety of microorganisms. This composition is even more effective than is iodine per se because it is non-caustic and substantially free from the deleterious effects of irritation, staining and instability which normally are associated with iodine-containing compositions.

Having described my invention in preferred embodiments, I claim as new and desire to protect by Letters Patent:

1. A germicidal composition comprising a paste having a pH of less than 9 and containing iodine and a nitrogen compound of the formula

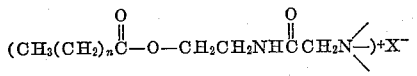

wherein n is any number between 4 to 20 inclusive, wherein the three indicated valence bonds attached to nitrogen are satisfied by members of a heterocyclic ring of which the nitrogen is a member, and wherein X is an anion, in relative proportions of from a trace to 25 parts by weight iodine and from a trace to 50 parts by weight nitrogen compound.

2. A germicidal composition comprising an aqueous solution having a pH of less than 9 and containing from a trace to 25% by weight iodine and from a trace to 50% by weight of a compound of the formula

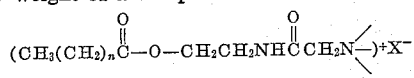

wherein n is any number from 4 to 20 inclusive, wherein the three indicated valence bonds attached to nitrogen are satisfied by members of a heterocyclic ring of which the nitrogen is a member, and wherein X is an anion.

3. A germicidal composition comprising an aqueous solution having a pH if less than 7 and containing from a trace to 25% by weight iodine and from a trace to 50% by weight of a compound of the formula

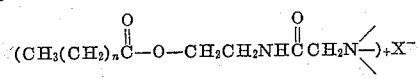

wherein n is any number from 4 to 20 inclusive, wherein the three indicated valence bonds attached to nitrogen are satisfied by members of a heterocyclic ring of which the nitrogen is a member, and where X is an anion.

4. The germicidal composition of claim 3 wherein the anion is a halogen ion.

5. The germicidal composition of claim 3 wherein the nitrogen atom is a member of a pyridine ring.

6. The germicidal composition of claim 3 wherein the nitrogen atom is a member of a quinoline ring.

7. The germicidal composition of claim 3 wherein the nitrogen atom is a member of an isoquinoline ring.

8. The germicidal composition of claim 3 wherein the nitrogen atom is a member of a pyrolidine ring.

9. A germicidal composition comprising an aqueous solution having a pH of less than 7 and containing from a trace to 25% by weight iodine and from a trace to 50% N caproyl colamino formyl methyl pyridinium chloride.

10. A germicidal composition comprising an aqueous solution having a pH of less than 7 and containing from 0.1 to 15% by weight iodine and 5 to 25% by weight N caproyl colamino formyl methyl pyridinium chloride.

11. A germicidal composition comprising an aqueous solution having a pH of less than 7 and containing from a trace to 25% by weight iodine and from a trace to 50% by weight of N lauroyl colamino formyl methyl pyridinium chloride.

12. A germicidal composition comprising an aqueous solution having a pH of less than 7 and containing from a trace to 25% by weight iodine and from a trace to 50% by weight of N myristoyl colamino formyl methyl pyridinium bromide.

References Cited in the file of this patent

UNITED STATES PATENTS

| | | |
|---|---|---|
| 2,290,173 | Epstein et al. | July 13, 1942 |
| 2,679,533 | Darragh | May 25, 1954 |

OTHER REFERENCES

Lawrence: Surface-Active Quaternary Ammonium Germicides (1950), pp. 76-79.